United States Patent Office 3,364,151
Patented Jan. 16, 1968

3,364,151
CATALYST CONTAINING SILICA-ALUMINA AND FINELY DIVIDED $CaF_2$, $MgF_2$, $SrF_2$, $AlF_3$ OR $InF_3$
Wayne L. Disegna, Markham, and Henry Erickson, Park Forest, Ill., assignors to Sinclair Research, Inc., New York, N.Y., a corporation of Delaware
No Drawing. Filed Jan. 26, 1966, Ser. No. 523,050
4 Claims. (Cl. 252—441)

ABSTRACT OF THE DISCLOSURE

Catalyst suitable for use in fluid cracking of hydrocarbons is finely divided composite of synthetic silica-alumina, promoted with $CaF_2$, $MgF_2$, $SrF_2$, $AlF_3$ or $InF_3$, the composite being formed by admixture of the metal fluoride in finely divided form (up to about 15 microns particle size) with a silica-alumina hydrogel and drying the mixture; composite may contain, for example, about 95 to 99.5% silica-alumina (alumina representing about 25–35% of the silica-alumina) and about 0.5 to 5% of the metal fluoride.

---

This invention is directed to novel catalyst compositions which are characterized by greatly improved catalytic activity, selectivity, and resistance to the harmful effects of metal poisoning and high temperatures when used in hydrocarbon cracking processes.

Hydrocarbon cracking catalysts in current use exhibit a loss in ability to convert heavier petroleum stocks to gasoline and a decrease in selectivity, caused by a relatively slow accumulation of metals on the catalysts. Such metals are normally present in the hydrocarbon feed stocks which are cracked and the metals which deposit on the cracking catalysts are not removable by standard regeneration procedures. Thus the presence of nickel and vanadium and other metallic contaminants in the hydrocarbon feed stream leads to the rapid poisoning of most catalysts, causing a significant decrease in the gasoline yield, an increase in coke and gas production and a marked shortening in catalyst life. Also existing cracking catalysts are adversely effected when exposed to steam at a high temperature, for example, in catalyst regeneration.

One of the purposes of using a cracking catalyst in a petroleum refinery operation is to selectively increase conversion of normally liquid higher boiling petroleum stocks to gasoline. One of the known methods of increasing this conversion is by the addition of a fluoride to the cracking catalyst. It had been noted that the in situ formation of a fluoride compound in the lattice of the cracking catalyst utilizes the promotional effects of the fluoride. However, one of the major drawbacks to this method of fluoride addition is the poor stability of the promoting compound. After a fluoride-promoted catalyst has been used in the cracking reaction for a period of time the activity drops off and an analysis of the catalyst shows that the fluoride has substantially volatilized.

The catalysts of the present invention are improved with respect to cracking activity and selectivity and, therefore, can produce increased amounts of gasoline. In a further feature, the catalysts of the present invention are far more resistant to the effect of high temperature steam, which is present in all catalytic cracking units. This greater thermal stability may be utilized in various ways. For example, higher temperatures and steaming rates can be used before regeneration, allowing more efficient stripping of hydrocarbons from the catalysts prior to regeneration and resulting in higher recovery of liquid hydrocarbons and a lesser coke load in the regenerator. Since many, if not most, catalytic cracking units are limited in throughput by coke-burning capacity in regeneration, a small increase in stripper efficiency is magnified in importance. Added advantages include the ability to increase the coke-burning capacity by increasing regeneration temperatures. Advantageously, feed stocks higher in coke precursors than customary may be utilized if coke-burning limitations are raised by more efficient stripping and higher regenerator temperatures.

In accordance with the present invention it has been discovered that mixtures of a finely divided Group II-A or Group III-A metal fluoride and silica-alumina in the hydrogel state can provide improved fluid cracking catalysts which also contain the metal fluoride in relatively stable form and the promotional effects of the fluoride are maintained over a relatively long period of time. Apparently the physical combination of the metal fluoride with the silica-alumina catalyst while it is in the hydrogel state achieves an intimate combination of fluoride particles around which the gel contracts to form the fluid catalyst composite of the present invention.

The silica-alumina component of the catalyst composition of the present invention is a synthetic silica-alumina hydrogel which contains about 55–90, preferably about 65–75, weight percent silica and about 10–45, preferably about 25–35, weight percent alumina on a dry basis. The silica-alumina hydrogel can be prepared by various procedures as known in the art and is in a fluid form, i.e., a finely divided material, for instance, often about 20 to 150 microns. The hydrogel form is the undried gel which is distinguished from the dried or xerogel form. The amorphous hydrogel can be prepared, for instance, by coprecipitation or sequential precipitation with either component being the initial material precipitated and at least the principal part of the silica or alumina being made in the presence of the other. Often the alumina is precipitated in the presence of a silica gel. It is preferred that the silica-alumina hydrogel can be made by forming a silica hydrogel by precipitation from an alkali metal silicate solution and an acid such as sulfuric acid. Then alum solution may be added to the silica hydrogel slurry. The alumina is precipitated by raising the pH by the addition of an aqueous sodium aluminate solution or by the addition of a base such as ammonium hydroxide. Other techniques for preparing the silica-alumina hydrogel are well known in the art, and these techniques may be used in the practice of the invention. The silica-alumina may contain minor amounts of other components, e.g. other refractory metal oxides.

The finely divided metal fluorides which are physically mixed wtih the silica-alumina hydrogel to form the fluid catalyst compositions of the present invention include one or more of the Group II-A and Group III-A metal fluorides. The Group II-A metal fluorides include beryllium fluoride, barium fluoride, calcium fluoride, magnesium fluoride, and strontium fluoride. All of these metal fluorides have melting points greater than 1450° F., with beryllium fluoride having the lowest at 1470° F., and strontium fluoride the next lowest at 2175° F. The Group III-A metal fluorides which are effective in promoting the silica-alumina hydrogel catalyst of the present invention include aluminum fluoride, gallium fluoride, indium fluoride and thallium fluoride. Thus the Group II-A and Group III-A metal fluorides possess good thermal stability and are essentially unaffected by ordinary cracking catalyst regeneration temperatures.

In forming the catalyst composition of the present invention, the metal fluoride may be added to the silica-alumina hydrogel in a minor amount, e.g. in concentrations of about 0.1 percent to 45 percent by weight of the catalyst, preferably about 0.5 percent to 5 percent. The metal fluorides of small particle size are effective in promoting the catalysts of the present invention and metal fluorides having a particle size of up to about 10 or even up to about 15 microns are useful. After the solid metal fluoride and silica-alumina hydrogel are intimately mixed, the fluid catalyst can be formed by drying and calcination to an active state. Frequently, the dried catalyst, i.e., with most, if not all, of its free water removed, would be made and calcination conducted by treatment of the catalyst in the regenerator of a fluid catalytic cracking unit.

The present invention will be illustrated by the following examples.

Example I

A silica-alumina hydrogel was prepared by the following technique:

To a batch tank was added 4,275 gallons of water preheated to 90° F., and 865 gallons of sodium silicate solution (28.8 weight percent $SiO_2$, 40–41.5 Baumé at 68° F. and $Na_2O:SiO_2$ ratio of 1:3.2). The batch is stirred for five minutes. The concentration of the sodium silicate, as $SiO_2$, in the batch is 6.3 weight percent. With the batch at 90° F., 302 gallons of 34.5 weight percent sulfuric acid solution at 182° F. were added over a period of 45 minutes. The gel formed about 35 minutes after acid addition was begun. The pH was then adjusted to 8.0–8.5 and the batch agitated for ten minutes.

Then 715 gallons of alum (7.8 weight percent, as $Al_2O_3$) was added to the gel over a period of about 36 minutes. The batch was agitated for an additional five minutes and 205 gallons of sodium aluminate solution (24.4 weight percent as $Al_2O_3$) diluted in 1080 gallons of water was added over a period of 17 minutes. After all the sodium aluminate was added, the pH was checked and found to be between 5.0 and 5.2. The alumina content of the silica-alumina hydrogel was 30–31%.

Example II

To illustrate the significance of physically mixing the metal fluoride with the silica-alumina hydrogel rather than forming the fluoride in situ in the catalyst structure, catalysts prepared by both methods were produced in Example II and their properties compared in Table I.

Two equal batches of silica-alumina hydrogel were made by the following procedure:

To 430 ml. $H_2O$ was added 430 ml. "E" brand sodium silicate. The mixture was cooled to 35° F. and added to 352 ml. of dilute (6N) $HNO_3$ also cooled to 35° F. To this mixture was added 920 ml. $H_2O$ containing 468 gm. $Al(NO_3)_3 \cdot 6H_2O$. At this point 8.5 gm. $Ca(NO_3)_2 \cdot 2H_2O$ was added to only one of the batches. Both batches are then allowed to gel. To the batch which contains the Ca ions was added 500 cc. $H_2O$ containing 40 cc. of 48 percent HF. This mixture was allowed to stand for one hour and then excess solution was drained off. Both batches were then treated for one hour, with 1500 cc. dilute (15 percent) $NH_4OH$, and washed for 48 hours with deionized water. To the batch which contained no Ca ions was added 8.0 gms. of finely ground (about 5 microns in size) $CaF_2$ with vigorous mixing. Both samples were dried overnight at 250° F., then calcined three hours at 1050° F. and tested in a bench scale catalytic cracking activity unit for converting gas oil to gasoline. After testing, the samples were steamed 24 hours at 1150° F. and retested in the bench scale unit. The results are listed below in Table I.

TABLE I

| Catalyst | $SiO_2 \cdot Al_2O_3$ +2% $CaF_2$ by in situ formation | $SiO_2 \cdot Al_2O_3$ +2% $CaF_2$ by physical mixing addition |
|---|---|---|
| Percent F | 1.29 | 1.13 |
| Percent $Al_2O_3$ | 30.2 | 29.9 |
| R.A. | 131.0 | 121.0 |
| D+L | 63.1 | 60.5 |
| G.F. | 0.85 | 0.86 |
| C.F. | 0.62 | 0.77 |
| G.G. | 1.40 | 1.43 |
| Steam 24 hours at 1,150° F., 1 atmosphere: | | |
| Percent F | 0.19 | 1.16 |
| Percent $Al_2O_3$ | 30.1 | 30.4 |
| R.A. | 8.85 | 69.3 |
| D+L | 14.1 | 46.5 |
| G.F. | 1.88 | 0.74 |
| C.F. | 3.34 | 0.72 |
| G.G. | 0.80 | 1.40 |

As can be seen from Table I, both samples had a relatively high virgin activity, but after 24 hours steaming at 1150° F. the sample which had $CaF_2$ added by in situ formation lost almost all the fluoride added and showed poor steam stability, complete degradation of activity and very bad selectivity characteristics as measured by gas factor, coke factor, and gas gravity.

Example III

To further demonstrate the increase in catalytic selectivity and activity, a synthetic, high alumina base line cracking catalyst without the metal fluoride promoters and with the metal fluoride promoters was tested in the catalytic cracking activity unit. The results are shown below:

To five 200 gm. portions of a washed, undried synthetic high alumina, silica-alumina hydrogel cracking catalyst as prepared in Example I was added 6 gms. $CaF_2$, 6 gms. $MgF_2$, 6 gms. $SrF_2$, 6 gms. $AlF_3$, and 6 gms. $InF_3$, respectively. The additions were made by placing the hydrogel, the fluoride and 400 cc. $H_2O$ in a Waring Blendor and intensively mixing them for 10 minutes. The excess water was then filtered off, the catalysts were dried overnight at 250° F., and calcined for 3 hours at 1050° F. 42.6 gm. portions of the $CaF_2$, $MgF_2$ and $SrF_2$ containing catalysts, and 100 gm. portions of the $AlF_3$ and $InF_3$ containing catalysts were then tested in the catalytic cracking activity unit. The remainders of the above samples were artificially poisoned with NiO and $V_2O_5$, teamed 24 hours at 1150° F. and again tested in the activity unit. The results are given in Table II.

TABLE II

| Catalyst | Base Line | +3% $MgF_2$ | +3% $CaF_2$ | +3% $SrF_2$ | +3% $AlF_3$ | +3% $InF_3$ |
|---|---|---|---|---|---|---|
| R.A. | 113 | 127 | 131 | 128 | 152.0 | 111.5 |
| D+L | 58.7 | 61.2 | 62.2 | 61.0 | 65.8 | 58.0 |
| G.F. | 0.96 | 0.86 | 0.85 | 0.94 | 0.86 | 0.98 |
| C.F. | 0.86 | 0.78 | 0.76 | 0.80 | 0.83 | 0.82 |
| G.G. | 1.35 | 1.47 | 1.42 | 1.39 | 1.46 | 1.41 |

[Impregnated with 800 p.p.m. NiO and 800 p.p.m $V_2O_5$ then steamed 24 hours at 1,150° F. atm. pressure]

| | | | | | | |
|---|---|---|---|---|---|---|
| Actual Metals: | | | | | | |
| NiO, p.p.m. | 721 | 796 | 712 | + 914 | 837 | 907 |
| $V_2O_5$, p.p.m. | 702 | 755 | 719 | 877 | 863 | 989 |
| R.A. | 51.7 | 56.7 | 63.0 | 61.0 | 64.5 | 53.0 |
| D+L | 36.5 | 42.2 | 45.0 | 44.2 | 45.5 | 41.2 |
| G.F. | 1.22 | 1.19 | 1.16 | 1.14 | 1.07 | 1.25 |
| C.F. | 1.02 | 0.92 | 0.75 | 0.88 | 0.73 | 1.03 |
| G.G. | 1.14 | 1.20 | 1.29 | 1.28 | 1.22 | 1.12 |

As can be seen from the above table, the fluoride promoted catalysts exhibited improved steam stability compared to the base line catalyst. In the case of calcium fluoride, strontium fluoride, and aluminum fluoride promoted silica-alumina catalysts the product distribution is significantly improved, especially for the poisoned catalyst.

*Example IV*

To further demonstrate the improvement in product distribution by using the promoted catalyst of the present invention, an unpromoted high alumina silica-alumina cracking catalyst product distributed is compared with that of the same catalyst promoted with calcium fluoride and aluminum fluoride.

To two 25 lbs. samples of the synthetic high alumina silica-alumina cracking catalyst hydrogel slurry of Example I (2.5 lbs. catalyst solids) were separately added .075 lb. of finely ground $CaF_2$ and 0.075 lb. of finely ground $AlF_3$ with vigorous mixing. The samples along with the base line sample, were washed, dried and calcined as in Examples II and III. The samples were tested in the activity unit, then steamed 24 hours at 1150° F. and retested. After the activity unit tests, the samples were evaluated for product distribution in the cracking of gas oil. The results are given in Table III.

TABLE III

| Catalyst | Base Line | Base Line +2% $CaF_2$ | Base Line +3% $AlF_3$ |
|---|---|---|---|
| Percent $AlF_3$ (actual) | | | 1.9 |
| Percent $CaF_2$ (actual) | | 2.1 | |
| Surface Area, m.²/gm | 332 | 407 | 344 |
| Pore Volume, cc./gm | 0.49 | 0.705 | 0.55 |
| R.A. | 116 | 143 | 108 |
| D+L | 59.6 | 64.8 | 57.8 |
| G.F. | 0.84 | 0.78 | 0.92 |
| C.F. | 0.90 | 0.79 | 0.94 |
| G.G. | 1.46 | 1.53 | 1.41 |
| Steam 24 hours at 1,150° F.: | | | |
| R.A. | 64.0 | 69.3 | 65.0 |
| D+L | 45.3 | 47.2 | 46.1 |
| G.F. | 0.78 | 0.74 | 0.82 |
| C.F. | 0.65 | 0.61 | 0.72 |
| G.G. | 1.53 | 1.53 | 1.54 |
| Product Distribution Test: | | | |
| Catalyst Temp. ° F | 880 | 870 | 870 |
| Conversion | 59.2 | 57.5 | 58.1 |
| $C_5$—410° F. Gasoline | 25.12 | 29.26 | 30.95 |
| Gas Oil | 40.80 | 42.50 | 41.90 |
| Coke | 4.70 | 2.30 | 1.80 |
| $C_5$—410° F. Gasoline | 32.72 | 37.08 | 39.48 |
| $C_4$—410° F. Gasoline | 44.56 | 47.93 | 49.79 |
| Wt. percent $C_3$ and minus Gas | 9.94 | 7.28 | 7.04 |

As can be readily seen from the product distribution tests, the calcium fluoride promoted catalyst yields a 16.4% increase in gasoline, a 4% increase in gas oil with a 50% reduction in coke formation. Comparing the aluminum fluoride promoted catalyst yields with the unpromoted base line catalyst yields show a 22.2% increase in gasoline, a 2.7% increase in gas oil and about a 60% reduction in coke formation.

Thus, this invention discloses catalysts compositions producing a considerable increase in desirable products and a decrease in the undesirable coke and light gas at comparable conversions.

The catalysts of the present invention are especially useful in the cracking of heavier or higher boiling hydrocarbons to lower boiling products, especially gasoline. Typically, the feed is a petroleum or other hydrocarbon gas oil and is often a mixture of straight run and recycle gas oils. Cracking conditions are well known and often include temperatures of about 850° to 1100° F., preferably about 900° to 1050° F. Other reaction conditions usually include pressures of up to about 1000 p.s.i.g., catalyst to oil ratios of about 5 to 25 to 1, and space velocities of about 3 to 60. The reaction is generally conducted in the essential absence of added free hydrogen and the catalyst is employed as a fluidized bed of small particles.

As noted above, the catalytic cracking system usually includes a regeneration procedure in which a portion of a catalyst is withdrawn from the cracking reactor and periodically contacted with free oxygen-containing gas in order to restore or maintain the activity of the catalyst by removing carbon. The regenerator gas temperature is often about 900° to 1300° F., or more preferably about 1150° to 1250° F.

It is claimed:

1. A finely divided synthetic gel catalyst composite consisting of a synthetic silica-alumina and a minor amount of a finely-divided metal fluoride promoter selected from the group consisting of $CaF_2$, $MgF_2$, $SrF_2$, $AlF_3$ and $InF_3$, said catalyst composite being formed by drying a physical mixture of the finely-divided metal fluoride with a finely divided silica-alumina hydrogel, said metal fluoride having a particle size of up to about 15 microns.

2. The catalyst composite of claim 1 wherein the silica-alumina hydrogel comprises about 95 to 99.5% of the catalyst composite and the metal fluoride promoter comprises about 0.5 to 5% of the catalyst composite.

3. The catalyst of claim 2 wherein the silica-alumina hydrogel contains about 25 to 35 weight percent alumina on a dry basis.

4. A finely divided, fluid hydrocarbon cracking catalyst composite characterized by improved thermal stability, catalytic activity and selectivity consisting of about 95% to 99.5% by weight of a synthetic silica-alumina containing about 25 to 35 weight percent alumina on a dry basis, the balance being essentially silica, mixed with about 0.5% to 5% by weight of a finely divided metal fluoride promoter having a particle size of up to about 10 microns and selected from the group consisting of $CaF_2$, $MgF_2$, $SrF_2$, $AlF_3$ and $InF_3$, said catalyst composite being prepared by drying a physical mixture of the finely-divided metal fluoride with a silica-alumina hydrogel having a particle size of about 20 to 150 microns.

References Cited

UNITED STATES PATENTS 2,400,446   5/1946   Veltman _____ 208—120

ABRAHAM RIMENS, *Primary Examiner.*